(12) United States Patent
Salowitz et al.

(10) Patent No.: US 12,380,155 B2
(45) Date of Patent: Aug. 5, 2025

(54) USER ACTIVITY HISTORY EXPERIENCES POWERED BY A MACHINE LEARNING MODEL

(71) Applicant: MICROSOFT TECHNOLOGY LICENSING, LLC, Redmond, WA (US)

(72) Inventors: Elizabeth Picchietti Salowitz, Kirkland, WA (US); David Ben Perry, Redmond, WA (US); Carlos A. C. Pessoa, Redmond, WA (US); Vivek Pradeep, Bellevue, WA (US); Sharath Viswanathan, Seattle, WA (US); Nathan James Luquetta-Fish, San Francisco, CA (US); Steven Bathiche, Redmond, WA (US); Eric Chris Wolfgang Sommerlade, Oxford (GB); Jose Antonio Lara Silva, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/216,366

(22) Filed: Jun. 29, 2023

(65) Prior Publication Data

US 2025/0005072 A1    Jan. 2, 2025

(51) Int. Cl.
*G06F 17/30* (2006.01)
*G06F 16/438* (2019.01)
*G06F 16/44* (2019.01)

(52) U.S. Cl.
CPC .......... *G06F 16/447* (2019.01); *G06F 16/438* (2019.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 12,147,428 B2 * 11/2024 Rahman ............ G06F 16/24542
2015/0227588 A1 * 8/2015 Shapira ............... G06F 16/9535
707/722

(Continued)

OTHER PUBLICATIONS

International Search Report and Written Opinion received for PCT Application No. PCT/US2024/033486, Oct. 22, 2024, 13 pages.

*Primary Examiner* — Hung D Le
(74) *Attorney, Agent, or Firm* — David W. Foster; Newport IP, LLC

(57) ABSTRACT

Machine learning techniques are leveraged to provide personalized assistance on a computing device. In some configurations a timeline of a user's interactions with the computing device is generated. For example, screenshots and audio streams may be saved as entries in the timeline. Context—the state of the computing device when the entry is created, such as which documents and websites are open—is also stored. Entries in the timeline are processed by a model to generate embedding vectors. The timeline may be searched by finding the embedding vector that is closest to an embedding vector derived from a search query. The user may select a query result, causing the associated context to be restored. For example, if the query is "show me all documents related to my upcoming trip to Japan", the query result may open documents and websites that were open when booking a flight to Japan.

13 Claims, 10 Drawing Sheets

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | |
|---|---|---|---|
| 2019/0324981 A1* | 10/2019 | Counts | G06F 16/358 |
| 2020/0210484 A1* | 7/2020 | Shlyunkin | G06F 16/909 |
| 2022/0012297 A1* | 1/2022 | Basu | G06F 16/587 |
| 2022/0156336 A1* | 5/2022 | Zhuang | G06F 16/9535 |
| 2023/0112710 A1* | 4/2023 | Huang | G06F 40/40 |
| 2023/0273940 A1* | 8/2023 | Shu | G06F 16/24556 707/600 |
| 2023/0394038 A1* | 12/2023 | Shahrokh Esfahani | G06N 3/045 |
| 2024/0126795 A1* | 4/2024 | Zhong | H04L 51/02 |
| 2024/0152561 A1* | 5/2024 | Mallapragada | G06F 16/9038 |
| 2024/0160673 A1* | 5/2024 | Dela Rosa | G06V 10/761 |
| 2024/0168952 A1* | 5/2024 | Rahman | G06F 16/24542 |
| 2024/0185396 A1* | 6/2024 | Hatamizadeh | G06T 5/60 |
| 2024/0265041 A1* | 8/2024 | Rennie | G06F 16/248 |
| 2024/0273126 A1* | 8/2024 | Bhathena | G06F 16/3346 |

\* cited by examiner

USER ACTIVITY HISTORY EXPERIENCES POWERED BY A MACHINE LEARNING MODEL

BACKGROUND

Users perform a wide variety of tasks with computing devices. Common tasks include booking travel, creating documents, video conferencing, and editing photos. Users often switch from one task to another, causing them to lose track of what they were working on. Similarly, when a user completes a task the user may lose track of confirmation emails, itineraries, and other resources generated when performing the task. Traditional search and retrieval methods, such as keyword-based searches, folder hierarchies, and app-specific organization tools, are often inadequate for quickly resuming a task or finding resources generated when a task was performed. These methods rely on users remembering specific details about their past activities, which can be challenging due to the vast amount of information that users generate and interact with.

For example, a user drafting a word processing document may not remember where the document was saved. This problem is exacerbated by the increasing number of storage locations available on modern computing devices. Instead of quickly picking up where they left off, the user may be forced to manually search through a number of directories, attachments, cloud drives, etc., before finding the file.

As another example, a user that was in the process of planning a trip may have forgotten which websites they were using to book flights and hotels. The user may attempt a keyword search on their browsing history, but keyword searches are often inadequate in deciphering context and user intent. For example, a search for travel-related websites may return results associated with a previous trip.

It is with respect to these and other considerations that the disclosure made herein is presented.

SUMMARY

Disclosed are systems and methods that leverage machine learning techniques to provide personalized assistance on a computing device. In some configurations a timeline of a user's interactions with the computing device is generated. For example, screenshots and audio streams may be saved as entries in the timeline. Context—the state of the computing device when an entry is created, such as which documents and websites are open, or what content was filled into a form—is also stored. Entries in the timeline may be processed by a machine learning model, such as a large language model or multi-modal generative model, among others, to generate embedding vectors that represent the entries in an embedding space.

The timeline may be searched by evaluating the associated embedding vectors. For example, an embedding vector derived from a query may be compared to the embedding vectors derived from the timeline. Embedding vectors that are closer, e.g., the distance between them in the embedding space is shorter, are considered more closely related. As such, embedding vectors derived from the timeline that are closest to the query embedding vector, or which are within a defined distance of the query embedding vector, are selected as query results. In some configurations, the user may select one of the query results causing the associated context to be restored. For example, documents and websites that were open when the vacation planning transcript entry was created are re-opened, and data that was entered into a web form may be restored.

Technical benefits of the disclosed embodiments include improved human-computer interaction, conservation of processing resources, improved search of local computing resources, and the like. Human-computer interaction is improved by allowing a user to search for content that was previously displayed by an application, even if the content was transitory and was not stored in a file. This unlocks new avenues for answering questions that a user may have about their operation of the computing device. The disclosed embodiments improve the conservation of processing resources by reducing the number of searches that a user may need to perform before they are able to retrieve the desired information/document/interaction.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
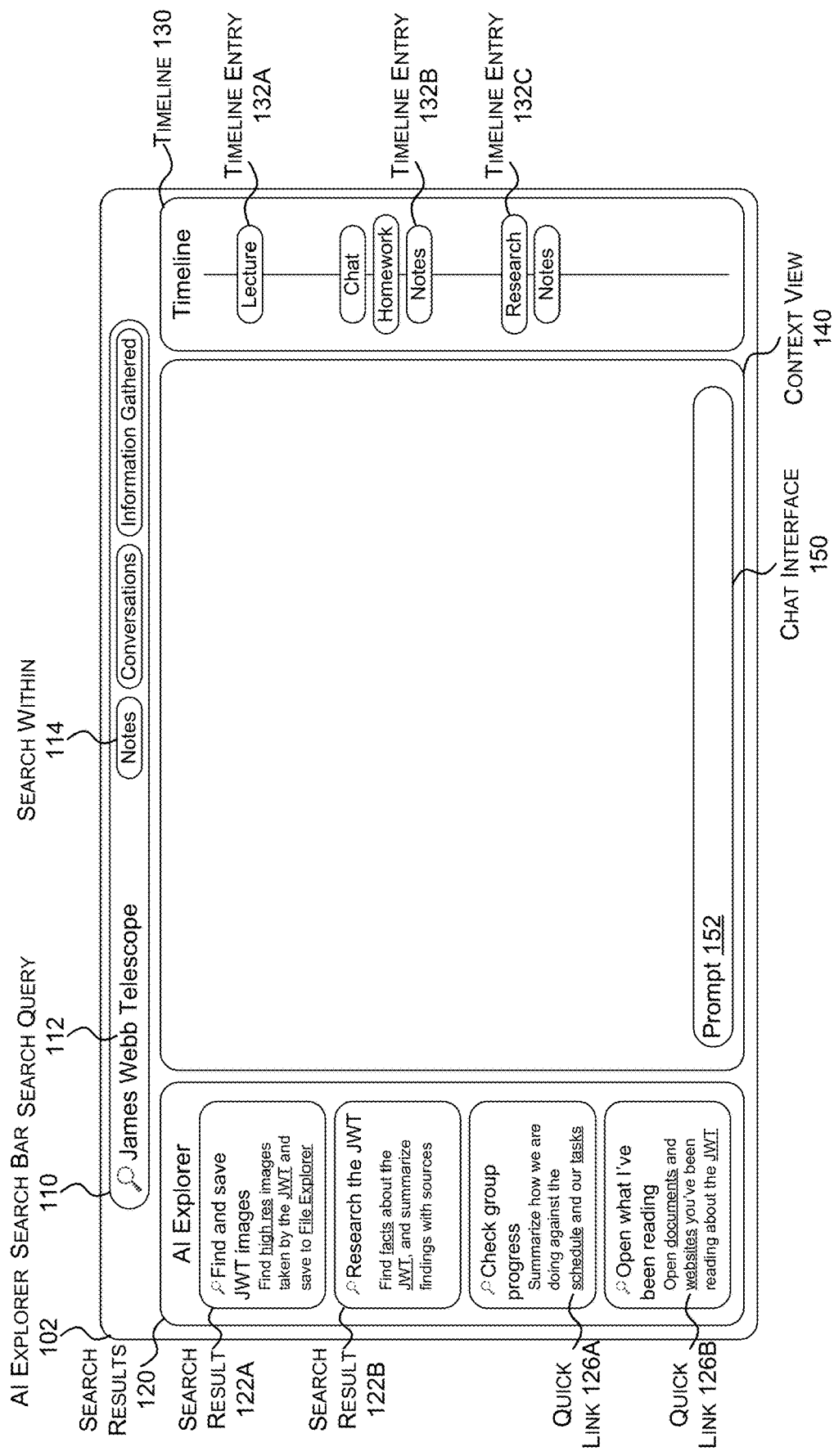
FIG. 1A illustrates searching a timeline of user interactions.

Computer users often struggle to find their "stuff"-documents, conversations, calendar items, emails, etc. The advent of cloud-based storage services has compounded these problems by increasing the number of potential storage locations. Computer users also find it difficult to retrieve information that was provided to or received from a particular endpoint, such as a website. For example, when planning a trip to Tokyo, a user may book plane tickets through a travel search engine while booking a rental car with the rental car company directly and booking a hotel through a corporate travel portal. There is no explicit connection between these activities, and there is currently no convenient way to retrieve everything related to the upcoming trip.

Disclosed are techniques for making it easier for users to locate past activities and information. In addition to finding files, emails, calendar events, and the like, users are able to search for specific interactions with their computing device. For example, a user might search for all of the social media profiles they visited yesterday. Continuing the example above about planning a trip, a user might search for "everything related to my upcoming trip to Tokyo."

Also disclosed are techniques for predicting what documents, websites, and other content may be relevant to the user, now and in the future. This content may be proactively suggested to the user. For example, a user's history of interaction with their computing device may be used to predict that an email might need to be drafted including the recipients, content, and attachments. The techniques described herein may automatically generate such an email draft, without the user having to make an explicit request.

In some configurations, artificial intelligence and/or machine learning models are leveraged to perform searches and proactively make suggestions. Models such as large language models, which can be multi-modal, operating over video, audio, text, and other input formats, have proven useful when reasoning about text-based data. For example, conversational interfaces and/or chatbots are adept at understanding natural language, generating text, sentiment analysis, and named entity recognition. Some models, such as multi-modal generative models, are also able to reason over images, audio streams, and other types of data. In some configurations, a model is applied to interaction data—data that is gathered as a user interacts with their computing device.

Interaction data represents what the computing device was receiving as input or generating as output, such as a screenshot, an audio stream, and/or user input events such as key presses, mouse movements, voice commands, gestures, and/or any other suitable user input. Interaction data may be generated during any type of user task, such as browsing the web, participating in a meeting, playing a game, authoring a document, etc. Screenshots that capture user interaction data may be taken continuously, periodically, or at particular points in time. Pieces of interaction data are stored as entries in a timeline, which maintains a history of user interactions with the computing device.

Context information representing the state of the computing device may also be captured and stored when interaction data is obtained. Context information may include application state, user information, time and location information, and the like. Application state may include a list of applications that are running, an indication of the active application, a list of documents that are open, a list of websites that are displayed, the sizes and locations of windows, etc. User data may include, for example, user credentials or user preferences. Interaction data and corresponding context data may be used to recreate the state that the computing device was in at the time the interaction was recorded. The ability to configure an application to take on the state it was in previously allows users to find the files, documents, document content, websites, form content, and other content and context that existed in the moment but would otherwise be difficult if not impossible to find.

In some configurations, an artificial intelligence and/or machine learning model is applied to pieces of interaction data stored in entries of the timeline, transforming them into interaction embedding vectors—also referred to herein as interaction embeddings. An embedding vector is a vector of numbers that represents an object. For example, in natural language processing (NLP), these objects may be words or characters. Embedding vectors represent objects in a high-dimensional vector space in such a way that the similarity between objects is preserved in the vector space.

A timeline search engine may leverage the stored interaction embeddings to process queries. An example of a query may be "show me all of the documents we looked at during our meeting last week." The timeline search engine uses the model to convert the query into a query embedding vector. The query embedding vector—also referred to as the query embedding—may be part of the same embedding space as the interaction embeddings or adapted to the embedding space of the interaction embeddings. In either case, the query embedding vector may be used to search across the interaction embeddings space. As such, the timeline search engine identifies query results by finding interaction embeddings that are closest to, or within a defined distance of, the query embedding.

A query result selection engine may identify one or more query results and display them to the user. Query results may be displayed along with the corresponding interaction data. For example, if one of the interactions returned in the query results is associated with a screenshot, the screenshot may be displayed to the user. Similarly, an audio stream, a transcript of an audio stream, or the like may be presented to the user. The query result selection engine may receive a user selection of one or more query results. In some configurations, multiple query results may be selected.

A context recreation engine may be invoked to recreate the context(s) associated with the selected query result(s). The context recreation engine may use details stored in the associated context(s) to open applications, documents, and/or websites, etc., restoring the state of one or more applications to when the interaction(s) occurred. Additionally, or alternatively, the context recreation engine may display a list of links that may be activated to open individual documents, websites, or other items identified by context information. This enables the identified content to be explored without restoring the state of an application. For example, a document itself may be opened, without having to restore the state of a video conferencing application in which the document was shared. In some configurations, context information includes credentials or other login information that may be automatically entered into websites in order to directly navigate to content.

In some configurations, a content suggestion engine may search through interaction embeddings of the transcript to identify documents to open, websites to visit, meetings to begin, documents to share during an active meeting, or other items that are relevant to the current context. The content suggestion engine may be manually invoked, e.g., in response to a user command, or the content suggestion engine may be invoked periodically or at strategic points in time, such as when opening a document, joining a meeting, etc.

In some configurations, the content suggestion engine automatically generates queries based on the current context. For example, if a user is participating in a meeting, the current context may include the fact that the user is in a meeting, a list of meeting participants, documents that are being shared, a title of the meeting, etc. The context may also include other applications and documents that are open. The content suggestion engine may automatically generate one or more queries based on this context and submit the queries to the artificial intelligence and/or machine learning model, which converts them to query embeddings. The query embeddings may then be used to search interaction embeddings for relevant content, e.g., based on proximity in the embedding space. Examples of content that may be found in this way include a document that was authored by one of the meeting participants, a document that contains content similar to content being discussed in the meeting, or the like. These are examples of the types of content that a model may identify as relevant. Some models, such as large language models, enable searching based on many different aspects of the current context, beyond what is practical to program using traditional coding techniques.

In addition to identifying documents, the query may also identify a previous meeting as being relevant to the current meeting. This determination may be based on the meetings having a shared topic. In some configurations, a shared topic may be determined based on an analysis of a transcript of the previous meeting and an analysis of a transcript of the current meeting, although participants, title, shared screen content, time of day, and other factors may also affect whether embedding vectors of the two meetings are close enough in the embedding space to be relevant. For example, the transcript of the previous meeting may have included a conversation in which one participant promised to provide a document to another participant. The content suggestion engine may remind the user of this promise, or even propose a document that fulfils the promise.

In some configurations, the content suggestion engine augments the current context with an explicit query. Both the current context and the explicit query may be provided to the model to obtain a query embedding. For example, the content suggestion engine may provide the model with a screenshot of an in-focus application along with a prompt such as "related documents". The model will generate an embedding vector that represents documents that are related to the in-focus application.

The content suggestion engine may supply prompts based on the context of the in-focus application. For example, if the in-focus application is an email application in which the user is composing a new email, the content suggestion engine may provide to a model a screenshot of the email along with a prompt related to drafting emails, such as "what documents make sense to attach to this email". The content suggestion embeddings generated by the model could then be used to search the timeline for documents to the email being drafted.

In some configurations, screenshots are copied from a graphics buffer that is used by a graphics card to render pixels to a display. This technique has the advantage that any type of content can be analyzed, independent of the techniques, libraries, or other aspects of how the graphics are generated. Additionally, or alternatively, graphics calls that draw to the graphics buffer may be intercepted and analyzed to determine what content has been drawn to particular portions of an application. This enables text, UI controls, and other building blocks of a user interface to be analyzed in formats other than bitmaps. Audio streams generated by an application may similarly be copied out of an audio buffer, although other techniques for recording audio generated by the computing device are similarly contemplated.

In some configurations, interaction embeddings may be analyzed to identify patterns in user behavior. These patterns may be used to suggest documents, websites, meetings, tasks, and the like. For example, a task pattern identification engine may analyze interaction embeddings to identify a recurring email, such as a status email. The email may be deemed recurring based on a proximity to other emails in the embedding space, although other techniques for determining a set of recurring emails may be combined with the comparison of interaction embeddings. The task pattern identification engine may then use the model to analyze the recurring emails for common recipients, common topics, common attachments, etc. The task pattern identification engine may use these attributes to create a routine that drafts subsequent iterations of the recurring email. Additionally, or alternatively, the task pattern identification engine may identify when a recurring email is being drafted and provide suggested content or attachments. The suggested content and/or attachments may be generated by prompting the model with a request to predict what will be discussed in the instant email based on the content of the previous emails.

FIG. 1A illustrates searching a timeline 130 of user interactions. AI explorer 102 is a user interface that enables a user to browse through timeline 130 of interactions that the user has had with one or more computing devices. Timeline 130 contains a number of timeline entries 132. Each timeline entry 132 represents an interaction the user had with an application. Interactions may represent outputs generated by the application, such as graphics, text, images, audio, virtual reality projections, tactile output, or the like. Interactions may also represent inputs, such as microphone input, keyboard or mouse input, touch input, etc. Interactions may be stored as screenshots, audio recordings, transcripts, or any other direct or indirect representation of the output generated or input received by the computing device.

Timeline 130 may be interacted with by a user, e.g., by zooming in or out to reveal interactions at different levels of granularity. Timeline 130 may also be adorned with date/time indications, such as tic marks and numbers, that denote how long ago an entry happened. In some configurations, timeline 130 is not presented as part of a graphical user interface but operates in the background responding to queries or proactively offering suggestions.

Timeline entry 132 may be generated automatically as the user interacts with the computing device. For example, timeline entries 132 may be created in response to particular events, such as bringing an application into or out of focus, an application receiving user input such as a keyboard press or mouse click, an application being refreshed to display different content, or the like. For example, a screenshot may be taken in response to the user opening a new document in an application, or as the user scrolls through a document that is open in the application. As referred to herein, a screenshot is a copy of a display buffer of a computer desktop, a particular window, one or more portions of a particular window, one or more windows associated with an application, or a combination or subset thereof. The screenshot may be captured by a screen understanding engine, described in more detail below in conjunction with FIG. 2, or the screenshot may be manually captured by a user or by any other technique. Other aspects of the capture, pre-processing, and analysis of interactions is also discussed more below in conjunction with FIG. 2.

Search bar 110 enables a user to provide a search query 112 to search the history of interactions stored in timeline 130. Query 112 may optionally also be used to search local and cloud-hosted files, the Web, emails, messages, databases, or the like. Search results 120 displays a list of individual search results 122. Search results from different types of searches may be intertwined or displayed separately.

When performing a search of timeline 130, search query 112 may be converted to a query embedding vector, which may then be compared to interaction embedding vectors associated with timeline 130. Interaction embeddings that are closest to or within a defined distance of the query embedding may be the basis for search results 122.

Search within suggestions 114 provide examples of types or categories of timeline entries to which the search may be focused. Search within suggestions 114 may be selected from timeline entries 132 based on a comparison of a query embedding generated for search query 112 and the interaction embeddings associated with timeline 130. A user may activate one or more of search within suggestions 114 to narrow the search results 120 to the selected type or category.

Search results 120 displays a list of individual search results 122 based on the search query 112 and the timeline entries 132 contained in timeline 130. Search results may be activated by clicking on a search result, for example, which opens a default action associated with the search result. For instance, clicking on search result 122A will find high resolution photos of the James Webb Telescope and save them to File Explorer. In addition to being displayed in line with each other, search results from different search modalities may be grouped or nested by topic, by date/time, by association with a particular user, or other criteria. For example, a travel itinerary obtained by searching timeline 130 may be correlated with a web search result that displays a map of the destination.

Individual search results may also have one or more quick links 126 that provide access to aspects of the search results. For example, quick link 126B opens a web browser and navigates to one or more tabs that displays a website previously used by the user to research the James Webb Telescope.

Chat interface 150 enables a conversational or chatbot style interaction with AI explorer 102. In some configurations, chat interface 150 is integrated into search bar 110 or vice-versa. A user may supply prompt 152 to chat interface 150. Prompt 152 may include text that is provided to a machine learning model, such as a large language model or multi-modal generative model. Prompt 152 may be augmented with additional information derived from the current context, such as the applications that are currently open, conversations or meetings that are currently active and their participants, documents that are open, content that is visible on the screen, etc. The output generated by the machine learning model may be displayed inline in the chat interface. Additionally, or alternatively, responses from the machine learning model may be used to generate user interface components that respond to the prompt, such as displaying a list of files, a list of applications, a list of people, or other suggestions that are particular to the user interface of a computing device.

Figure 1B:
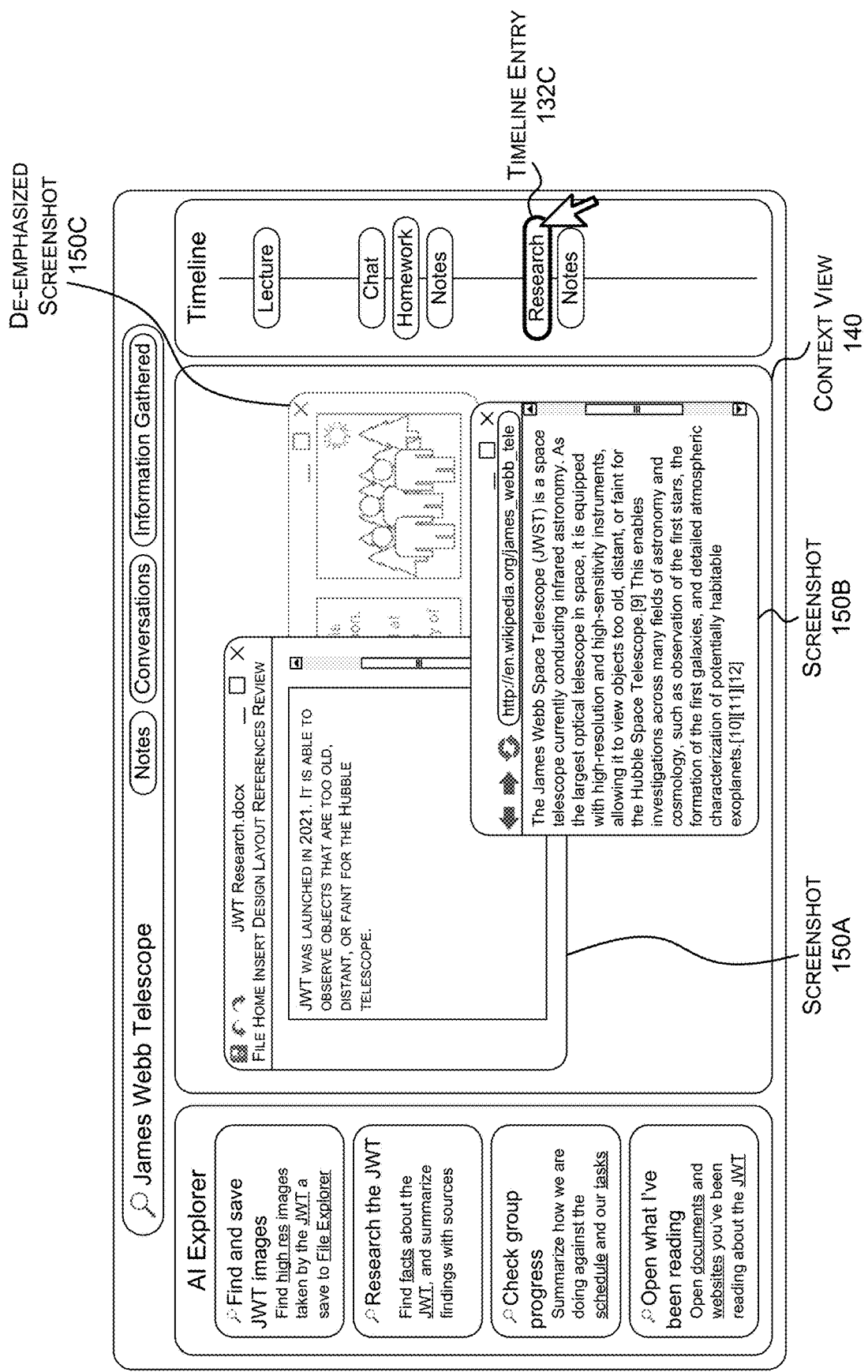
FIG. 1B illustrates displaying a state of an application at a previous point in time.

FIG. 1B illustrates displaying a state of one or more applications at a previous point in time. As illustrated, timeline entry 132C has been activated by a cursor. As a result, screenshots 150 are displayed, each illustrating what an application window was displaying at the time of the screenshot. In some configurations, context information associated with timeline entry 132C describes the size and location of the application windows represented by screenshots 150, enabling the screenshots to be displayed in the same positions relative to each other.

In some configurations, instead of screenshots, new instances of the applications are spawned and configured based on context information associated with timeline entry 132C. For example, an instance of a word processing program may be launched, resized and repositioned, and a particular document may be loaded to recreate the state of the word processing application when timeline entry 132C was created.

Timeline entries 132 are each displayed with a description, e.g., "Lecture" or "Research." These descriptions may be generated by an artificial intelligence and/or machine learning model that is asked to provide a short description for the content and context of the applications that were displayed when the timeline entry was created, among other techniques. However, not all applications that were displayed at this time need be associated with the description. This may be indicated, for example, by greying out screenshots of applications that are not associated with the description, as illustrated by de-emphasized screenshot 150C.

A user may click on one of screenshots 150, causing the corresponding application to be launched or reconfigured to the state it was in when the screenshot was taken. For example, screenshot 150B illustrates a web browser that has navigated to the WIKIPEDIA page of the James Webb Telescope. Clicking on this screenshot image causes AI explorer 102 to launch the same web browser and navigate to the same web page, allowing the user to pick up where they left off. In this way, AI explorer 102 enables DVR style functionality, enabling users to search through time and restore applications to a past state.

Figure 2:
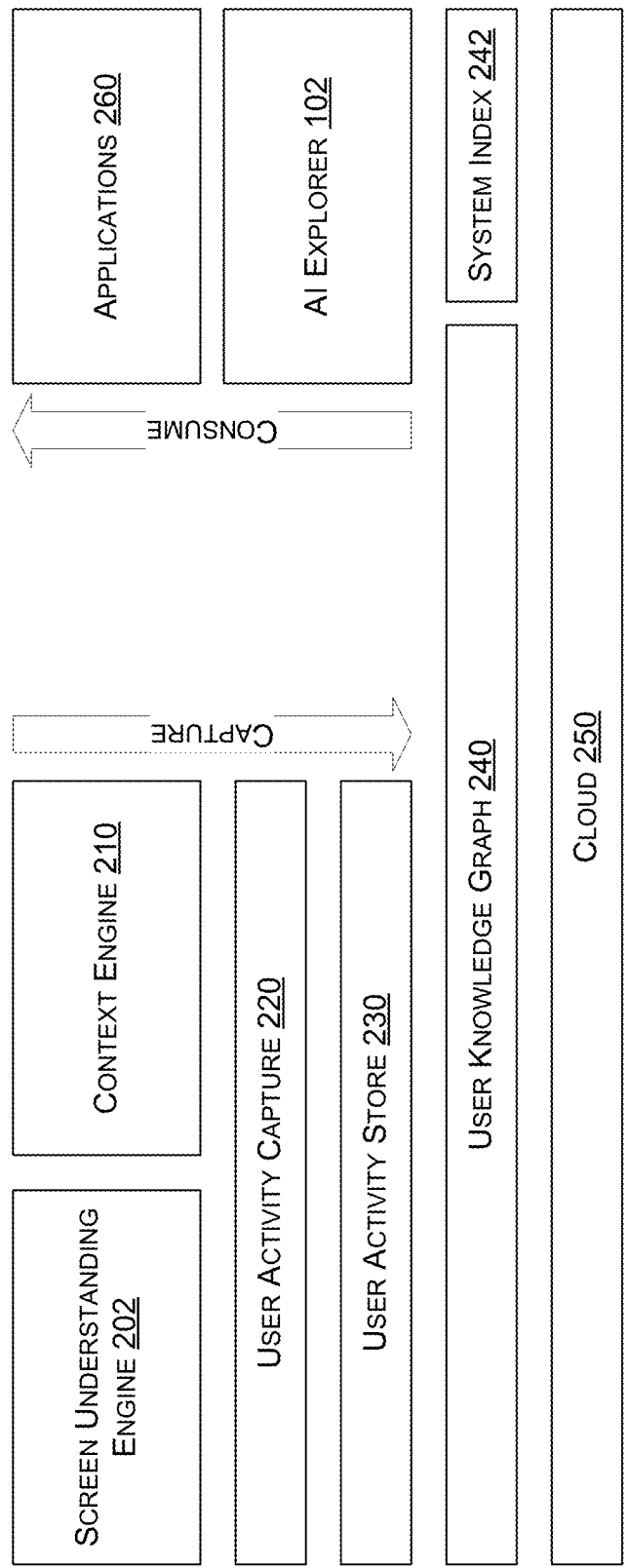
FIG. 2 illustrates capturing user activity, storing processed user activity, and consuming the processed user activity to facilitate displaying a state of an application at a previous point in time.

FIG. 2 illustrates capturing user activity, storing processed user activity, and consuming the processed user activity to facilitate displaying a state of an application at a previous point in time. Screen understanding engine 202 periodically takes screenshots of the desktop of a computing device. Screen understanding engine 202 may have a structured understanding of screen regions, enabling it to capture particular applications, particular application windows, or other portions of the display. For example, screen understanding engine 202 may limit the screenshot to one or more applications running on the desktop, or particular applications such as the active (in-focus) application.

Context engine 210 captures information about applications. In some configurations, context information refers to information that is not derived from content rendered by the application. For example, the size and location may be obtained for any application, as can whether the application has the operating system focus. Specific applications may have specific types of context information that is discoverable by context engine 210. For example, an electronic message application may display a conversation between two or more people. The electronic message application may display first and last names of each participant, while context engine 210 may determine the usernames of the participants. Similarly, context engine 210 may determine which document an application has open. Context engine 210 may determine usernames, file names, and the like via automation or usability application programming interfaces (APIs). In some configurations, context engine uses these APIs to extract information from an application that is rendered by the application, such as the content of a web form, but which is not practically or efficiently obtained by analyzing a screenshot of the application.

Context engine 210 may also capture user information, such as the user account that an application is running under, enabling AI explorer 102 to launch an application under the same user account when restoring application context. Context engine 210 may also capture the username and password of a website visited by a web browser, enabling the website to be automatically logged-into when restoring the context.

User activity capture 220 analyzes, detects, and captures particular moments of user interaction. It is impractical and potentially overwhelming to capture the content and context of an application continuously. Storage and processing needs would be exorbitant, and search results would be overwhelming and indistinguishable from each other. Accordingly, user activity capture 220 determines when to take a screenshot and which regions of the screen to capture. User activity capture 220 may select one or more windows from the application that has focus, any application that is visible, or a combination thereof. In some configurations, user activity capture 220 considers user preferences when determining which content to capture. For example, a user preference may be to exclude particular applications, documents from particular folders, emails from particular recipients, particular times of day or days of the week, etc.

User activity store 230 stores raw interactions and context data. Interactions, such as screenshots, are stored so that they may be analyzed by an artificial intelligence and/or machine learning model to produce an interaction embedding vector. Interactions are also stored so they may be referenced later, as discussed above in conjunction with FIG. 1B. User activity store 230 stores context information so AI explorer 102 can present screenshots of applications in the correct location relative to one another. Context information is also used by AI explorer 102 to restore a past application state.

User knowledge graph 240 stores embedding vectors that an artificial intelligence and/or machine learning model generated from the interactions. In some configurations, user knowledge graph 240 stores embedding vectors in a vector database that optimizes the operation of locating vectors that are close to one another. Vector closeness may be determined by a Euclidean distance, cosine similarity, or the like.

Additionally, or alternatively, user knowledge graph 240 stores textual representations of interactions. The closeness of two textual representations may be determined by how much of the text matches. For example, a percentage of characters that appear in the same order, or that appear in the same sequence, is one measure of closeness. Other techniques utilize a Levenshtein distance or similar algorithm. When queried with a textual representation of an individual interaction, user knowledge graph 240 may return a number of stored textual representations ranked by a measure of closeness to the individual interaction. One example of a textual representation of an interaction is the content of a web form.

System index 242 enables access to files, emails, and other resources that are referenced by the content and context of applications. Cloud 250 stores data similar to the data stored in user activity store 230 and user knowledge graph 240, but which was generated by other computing devices. This enables a user's interaction timeline from different devices to be leveraged by AI explorer 102.

AI explorer 102 and applications 260 consume the content and context information processed by screen understanding engine 202, context engine 210, user activity capture 220, user activity store 230, and user knowledge graph 240. These embodiments are discussed above, e.g., in conjunction with FIGS. 1A and 1B.

Figure 3:
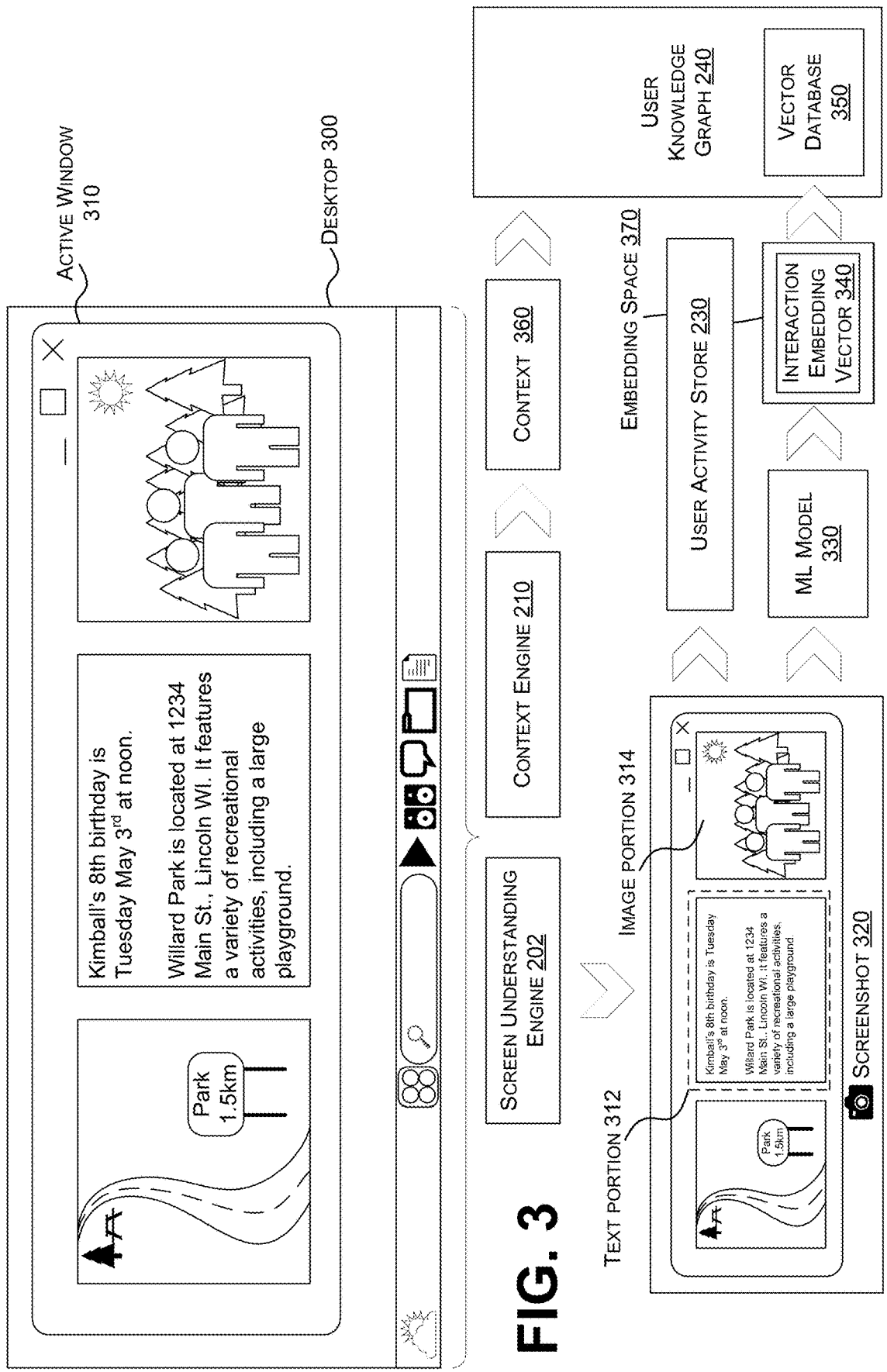
FIG. 3 illustrates using a screenshot to build a user knowledge graph that stores timeline entry embeddings.

FIG. 3 illustrates using a screenshot 320 to build a user knowledge graph 240 that stores interaction embeddings. As illustrated, active window 310 corresponds to the application depicted in FIG. 1B as de-emphasized screenshot 150C. Screen understanding engine 202 takes a screenshot 320 of active widow 310, copying the pixels rendered by active window 310 into a bitmap or other image format. In some configurations screen understanding engine 202 polls active window 310, periodically taking a screenshot. Additionally, or alternatively, screen understanding engine 202 takes a screenshot 320 of active window 310 at a particular time, such as when active window 310 gained the operating system focus, or otherwise as described herein.

Active window 310 displays images and text. User activity capture 220 may apply logic that segments screenshot 320 based on content type before deciding whether to add an entry to timeline 130. For example, text portion 312 is identified, and is distinguished from other regions such as image portion 314. Text portions, image portions, and other portions of active window 310 may be identified using a machine learning model or other image segmentation analysis techniques.

User activity capture 220 may apply different criteria to different types of content when deciding whether to add an entry to the timeline. For example, text portion 312 may be updated whenever the text has changed, or after a certain number of characters have changed, or after a certain period of time. Image portion 314 may be updated when any change is made, or on a less frequent basis. Content changes may be detected when a defined number of pixels change. Other types of changes are similarly contemplated, such as a change in saliency of an application window or a change of semantic embeddings of content displayed by the application window.

Saliency may change based on the position of the application window on the screen, the relative size of the window, the amount of interaction the window receives, and other criteria that gauge saliency of the window to a user. In some configurations, eye or gaze tracking, e.g. as implemented by a web cam, may be used to determine saliency of a particular window.

A change to a semantic embedding of content reflects a change at a higher level than pixel changes, including changes of content type, content meaning, etc. For example, a text paragraph may have a different semantic embedding when changing the topic, but not when fixing a typo.

User activity capture 220 creates an entry in timeline 130 by adding the raw screenshot 320 to user activity store 230. In some examples, the entire screenshot 320 is added even if only a portion of the screenshot is used to generate embedding vectors, so that the entire image is available for AI explorer 102 to display. Alternatively, only the relevant portion of raw screenshot 320 is stored, saving storage space. Screenshot 320 is indexed in user activity store 230 by interaction embedding vector 340, which is described below. This allows screenshot 320 to be retrieved in response to a search operation or a prediction operation as described above in conjunction with FIGS. 1A and 1B.

User activity capture 220 generates interaction embedding vector 340 by providing screenshot 320, or a portion thereof, to machine learning model 330. Machine learning model 330 may be a large language model or multi-modal generative model, among others, that is capable of synthesizing text, image, and audio data, data from different languages, and/or the like. This enables the user to search for an embedding vector by text description, drawing, verbal description of the search phrase, etc. ML model 330 yields interaction embedding vector 340 that corresponds to screenshot 320 or the portion thereof selected by user activity capture 220. User activity capture 220 provides interaction embedding vector 340 to vector database 350 of user knowledge graph 240. Interaction embedding vector 340, like any vector generated by ML model 330, is part of embedding space 370. An embedding space 370 refers to the possible values of an embedding vector, and may be defined by a number of dimensions and a number of bits of each element.

Context engine 210 obtains context information 360 of active window 310 when screenshot 320 is captured. Context information 360 may include information that is not explicitly displayed—i.e., information that may not be derivable from pixels or audio streams generated by the application, such as the size of active window 310, the location of window 310 on the desktop, the type of application that generated active window 310, etc. However, context information may also include data that has been rendered by the application or operating system, such as a filename of an open document. Other non-limiting examples of context information include a document author, participants in a meeting, recipients of an email, content of a web form, etc.

Context 360 may be stored in user knowledge graph 240 and/or user activity store 230. In either case, context 360 may also be indexed by interaction embedding vector 340, enabling it to be retrieved by a search operation or a prediction operation as described above in conjunction with FIGS. 1A and 1B.

Figure 4:
FIG. 4 illustrates the output of an application that was captured and used to predict user activity or information that should proactively be recommended to the user.

FIG. 4 illustrates the output of an application that was captured and used to predict what user activity or information should proactively be recommended to the user. User knowledge graph 240 stores a representation of user interactions and corresponding contexts as they were captured over time. This can be used to generate personalized recommendations. For example, when opening a word processing document that is attached to an email, the interaction history stored in user knowledge graph 240 may indicate that the user commonly opens similar documents in a full-featured word processing application instead of a web-based word processing application or an embedded word processing application. This indication may be used to override the default action taken when opening the document, or to change the default action. Similarly, user knowledge graph 240 may indicate that documents with different features, e.g., different content, file names, or authors, may historically have been opened in a web-based word processing application, and so a recommendation may be made accordingly.

Predictions, such as a preferred application to open, or a document that a user may wish to review while in a particular meeting, are based in part on a closeness of an embedding vector derived from the context of the current screen to embedding vectors that represent previous interactions and their contexts.

In some configurations, user knowledge graph 240 may also store usage data, such as a number of times that the user has interacted with content on a particular topic, the number of times a particular document or application has been opened, whether a feature of an application was launched with a short-cut key or by navigating a menu, or the like. For example, user knowledge graph 240 may also store a number of times that a user generated content or viewed content on a particular topic. These counts may be used in conjunction with embedding vector distance to select suggested content, suggested applications to launch, and other operations that are proposed based on the current context.

In some configurations, ML model 330 is extensible and user knowledge graph 240 is made available to ML model 330, e.g., as a plug-in. This enables ML model 330 to incorporate the representations of user interactions and associated contexts when reasoning over a prompt. For example, a user may ask ML model 330 via chat interface 150 to provide the three most recent interactions the user had with a particular individual, such as their boss. ML model 330 may query user knowledge graph 240 to identify interactions such as emails, documents, instant messages, phone calls, and other interactions the user had with their boss. This information may be used to generate a supplemental prompt that is submitted to ML model 330, or another ML model, for further processing. For example, ML model 330 may use the information about the three most recent interactions the user has had with their boss to create the prompt "reason over the May $22^{nd}$ email from Sam RE Johnson proposal, the May $21^{st}$ group chat with Sam and Sam's boss Alex, and the phone call on April $30^{th}$". This supplemental prompt may then be submitted with prompt 152 to ML model 330 for further processing.

Online meeting 400 may be presented via a video conferencing application and displays a number of participants 410, a live transcript 420, and a shared document 430. Participants 410, transcript 420, and shared document 430 are examples of content that may be captured by a screenshot. In some configurations, a screenshot of online meeting 400 is used to generate a single interaction embedding vector 340. In other configurations, screenshot portions such as participants 410, transcript 420, and/or shared document 430 may be extracted and used to generate different interaction embedding vectors 340. In some configurations, the content of transcript 420, the list of participants 410, and the content of shared document 430 may be obtained by an API call to online meeting 400 and/or the video conferencing application that hosts the online meeting 400, such as an automation or accessibility API.

When transforming participants list 410, transcript 420, and shared document 430 into interaction embedding vectors, ML model 330 may also be provided with descriptions or labels such as "participants", "transcript", and "shared document." These descriptions may be obtained from an automation or accessibility API. Including these terms in a search query may then improve search result accuracy.

In some configurations, a user operating the online meeting 400 may initiate a discovery mode that proposes suggested operations for the current context. For example, the user may provide a keyboard shortcut to activate the discovery mode. In other configurations, the discovery mode may be entered automatically, such as in response to joining a meeting. Once discovery mode has been activated, one or more application contexts and/or user interactions may be captured and provided to ML model 330 to determine a set of proposed operations that may be useful to the user. One example embodiment of a discovery mode is disclosed in the US Provisional Patent Application titled "Feature Discovery Layer", application Ser. No. 63/487,764, filed on Mar. 1, 2023. The content of this application is hereby incorporated by reference in its entirety.

For example, once discovery mode has been activated, mouse clicks, hovers, and moves, as well as keyboard presses and other types of user input, may be provided as tokens to a machine learning model 430 trained on a corpus of user interactions with the same or similar applications. In some configurations, context information 360 and screenshots 320 as described herein may be provided with the user input.

The machine learning model 430 may be trained to predict the mouse or keyboard action the user will take next. Additionally, or alternatively, the machine learning model 430 may be trained to predict operating system or application actions to take next, such as performing application or OS commands, opening documents, launching applications, inserting content, or any other action that user may take. In this way, similar to how an auto-regressive large language model predicts a next word of a response, model 430 predicts one or more actions that the user may want to take. A user interface depicting these one or more predicted actions may be presented to the user. The user may select from the list of predicted actions to accomplish a task they were intending to perform or even a task they did not know was possible.

Application interactions may also be semantically grouped, allowing action suggestions to be tailored to the particular grouping the current user input is associated with. For example, a user may begin work on a personal project using a code editor, a web browser navigated to a coding blog, and a command prompt. The user may then transition to preparing for a meeting with their boss using a presentation application and an email application. Machine learning model 430 may infer these two semantic groups. A user activity system that predicts what action a user will take next may limit suggested actions based on the semantic group the user is currently in. Additionally, or alternatively, the user activity system may identify a higher-order goal of a semantic group, such as creating a presentation for a particular meeting, and suggest actions that further the identified goal.

As illustrated, upon entering discovery mode, the image and/or personal information of meeting participant Aadi Kapoor may be provided to ML model 330 along with a prompt such as "what recent interactions have I had with Aadi Kapoor". ML model 330 may access user knowledge graph 240 to find a list of documents, previous meetings, or other interactions the user had with Aadi Kapoor. The results returned by ML model 330 are displayed in suggested operations 440-*a* menu that is superimposed over online meeting 400 with related documents, links to a previous meeting, etc.

Prompts provided to model 330 may be user-provided, such as prompt 152, automatically generated, or hard-coded. In some configurations the prompt supplied to ML model 330 is open ended, such as asking for related documents and other content. However, the prompt may also be tailored to a specific context. As illustrated, Aadi Kapoor is known to be a meeting participant, and so the prompt may be refined to "what recent meetings have I had with Aadi Kapoor". A prompt that is specific to meetings might ask "recall any deliverables that were promised in a previous meeting with these participants". ML model 330 may respond to such a prompt by querying user knowledge graph 240 for the transcripts of previous meetings with some or all of the participants, and then analyze the transcripts for promised deliverables. In some configurations, suggested operations 440 may then contain an option to find and display the suggested deliverables, or to help create them if they do not exist.

Figure 5:
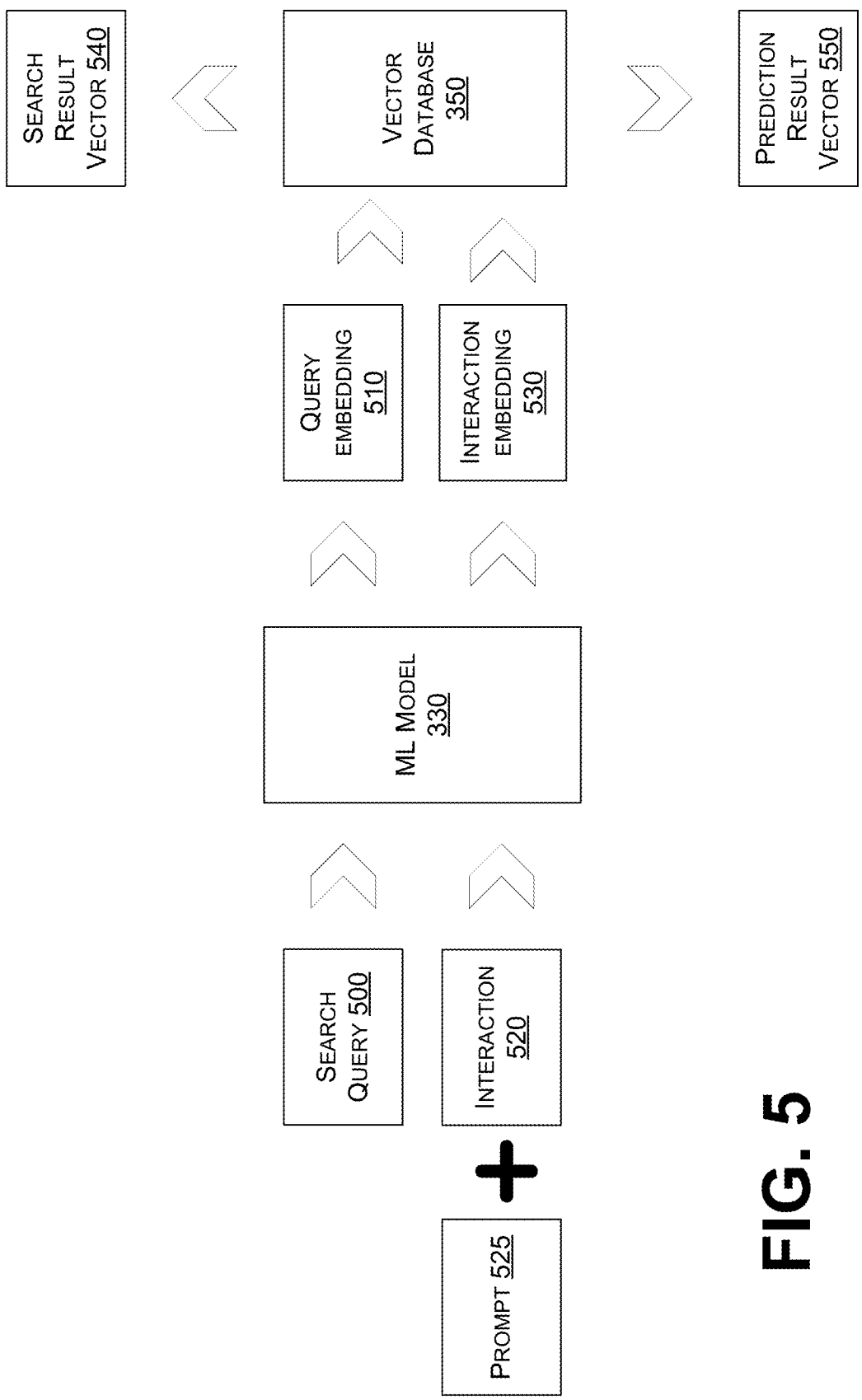
FIG. 5 illustrates applying search queries and application interactions to a machine learning model to generate query embeddings and application interaction embeddings, respectively.

FIG. 5 illustrates applying search queries and application interactions to a machine learning model to generate query embeddings and interaction embeddings, respectively. Search query 500 may be received from a user or may be inferred from the content and/or context of one or more applications or portions of applications. For example, search query 500 could target a particular type of application, such as an online meeting. Query 500 could also specify when the meeting took place, who participated, and what was discussed. Because query 500 is interpreted by an artificial intelligence and/or machine learning model, the number and type of search parameters are extensive, and the language used to make the query does not need to follow a particular structure. One example query 500 may be "find all meetings with Doug B. in which the October Johnson account summary was presented". The resulting query embedding 510 that was generated by ML model 330 could represent this query in embedding space 370, such that it would be close to interaction embedding vectors with similar semantics. Specifically, query embedding 510 may be used to search vector database 350 for search result vector 540—an embedding that is closest to, or within a defined distance of, query embedding 510. For example, a meeting that took place two weeks ago, which was attended by Doug B. and Sarah J., and which discussed the October Johnson account summary, may be identified and presented to the user in a search result. Similar meetings may also be presented, such as a meeting from two months ago with Doug B., but which did not discuss the October Johnson account summary.

FIG. 5 also illustrates how interaction 520 may be provided to ML model 330 to generate interaction embedding 530. Interaction 520 may be a screenshot or a portion of a screenshot of a current application. Interaction 520 may be used to generate interaction embedding 530 when predicting a document to load, an application to launch, a document to attach to an email, text with which to complete a sentence, or any other operation that might assist the user. Interaction 520 may be obtained by periodically taking a screenshot of an active application. Interaction 520 may be screenshot 320, or interaction 520 may be captured separately using different criteria than screenshot 320. Interaction 520 also may be obtained in response to one or more events that are observed in the underlying application. These events may be similar to the events that determine when to create a new entry in timeline 130.

Interaction 520 may optionally be augmented with prompt 525 that focuses interaction embedding 530 in a particular region of embedding space 370. For example, interaction 520 may be a screenshot of online meeting 400. In order to predict what the user may want to do next, the screenshot of online meeting 400 may be provided with a prompt 525 "find similar meetings". The resulting interaction embedding 530 will be closer in embedding space 370 to interactions derived from other online meetings. Interaction embedding 530 may be provided as part of a query to vector database 350 to find prediction result vectors 550 that are closest to or within a defined distance of interaction embedding 530. Prediction result vector 550 may be used to lookup a context 360 or a screenshot 320, which may be applied as discussed above in conjunction with FIGS. 1A and 1B.

Figure 6:
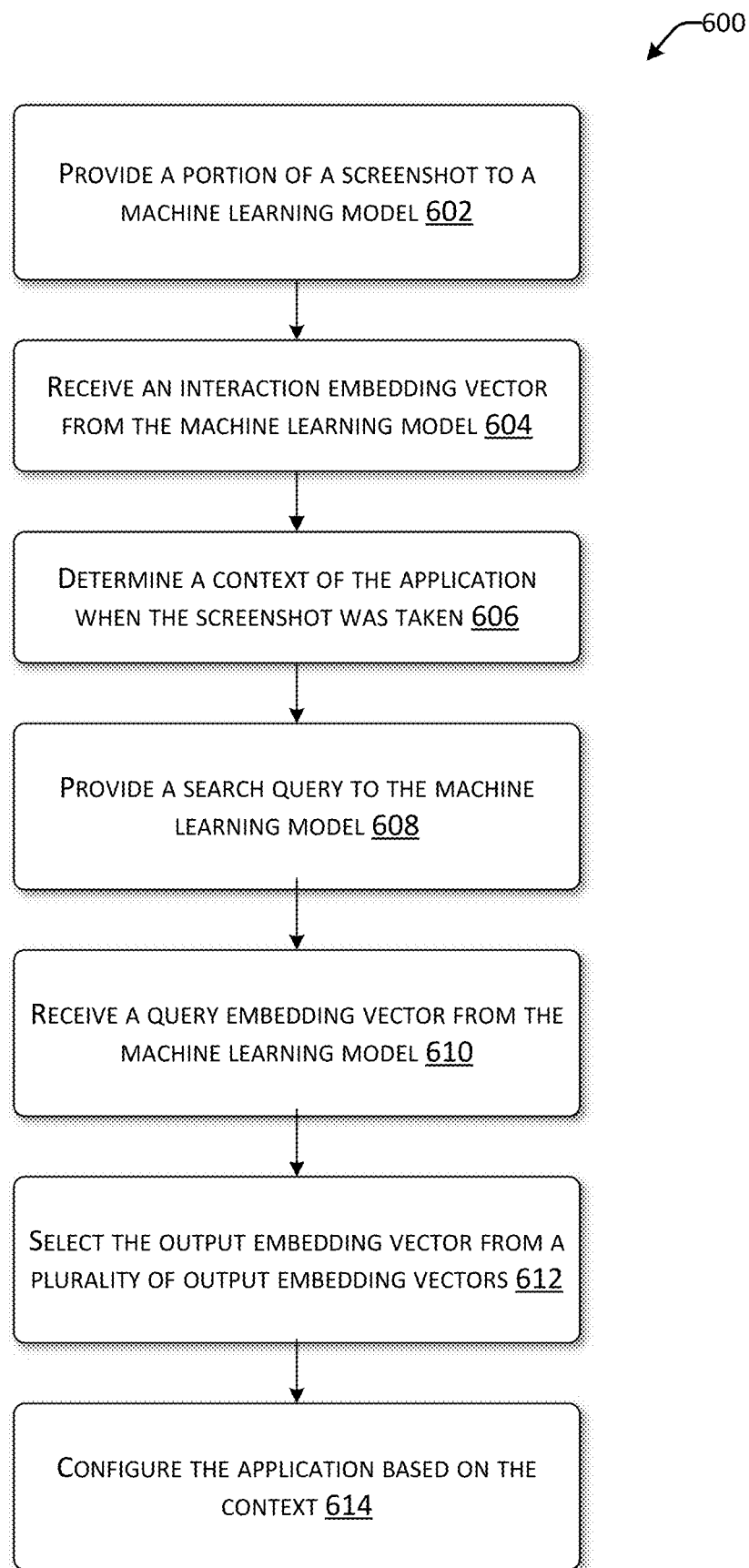
FIG. 6 is a flow diagram of an example method for searching a timeline for a previous application content and context.

FIG. 6 is a flow diagram of an example method for searching a timeline for a previous application content and context. With reference to FIG. 6, routine 600 begins at operation 602, a portion 312 of a screenshot 320 is provided to a machine learning model 330. The machine learning model 330 may be a large language model or a multi-modal generative model, among other examples, and the portion of the screenshot may have been obtained in response to an event such as a change of content of active window 310.

Next at operation 604, an interaction embedding vector 340 is received from machine learning model 330. The interaction embedding vector 340 represents the portion of the screenshot 320 in the embedding space 370 of the machine learning model 330.

Next at operation 606, a context 360 of the active window 310 is determined. Context 360 may refer to any attribute, metadata, or other information about active window 310 or the application that renders active window 310.

Next at operation 608, a search query 500 is provided to machine learning model 330. Search query 500 may be received from a user or automatically generated while predicting what the user may want to do next.

Next at operation 610, a query embedding vector 510 is received from the machine learning model 330. The query embedding vector 510 represents query 500 in the embedding space 370.

Next at operation 612, search result vector 540, which is closest to, or within a defined distance from query embedding 510 is identified.

Next at operation 614, an application 400 is configured according to the context 360 stored in user knowledge graph 240 that is indexed with search result vector 540.

Figure 7:
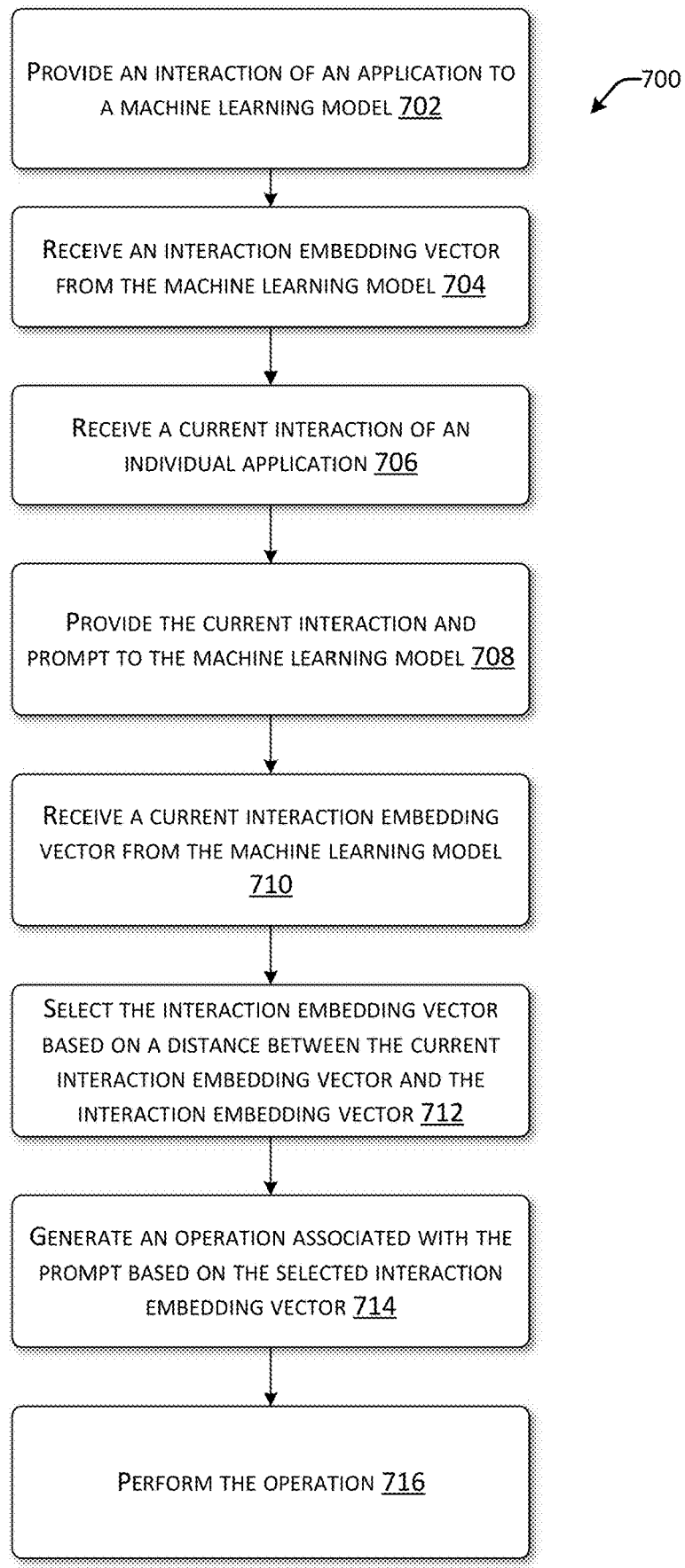
FIG. 7 is a flow diagram of an example method for predicting what user activity or information should proactively be recommended to the user based on a timeline of user actions.

FIG. 7 is a flow diagram of an example method for predicting what user activity or information should proactively be recommended to the user based on a timeline of user actions. With reference to FIG. 7, routine 700 begins at operation 702, a portion 312 of a screenshot 320 is provided to a machine learning model 330. The machine learning model 330 may be a large language model or a multi-modal generative model, among other examples, and the portion of the screenshot may have been obtained in response to an event such as a change of content of active window 310.

Next at operation 704, an interaction embedding vector 340 is received from machine learning model 330. The interaction embedding vector 340 represents the portion of the screenshot 320 in the embedding space 370 of the machine learning model 330.

Next at operation 706, a current interaction 520 of an individual application 400 is received. The current interaction may be a screenshot taken when the content of the individual application 400 changed.

Next at operation 708, the current interaction 520 is provided to the machine learning model 330 with prompt 525.

Next at operation 710, the current interaction embedding vector 530 is received from the machine learning model 330.

Next at operation 712, prediction result vector 550 is obtained from vector database 350 based on a distance from application interaction embedding vector 530.

Next at operation 714, an operation 122 associated with prompt 525 is generated based on the prediction result vector 550 selected from vector database 350.

Next at operation 716, the operation 122 is performed.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routines 600 and 700 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routines 600 & 700 may be also implemented in many other ways. For example, the routines 600 & 700 may be implemented, at least in part, by a processor of another remote computer or a local circuit. In addition, one or more of the operations of the routines 600 & 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 8:
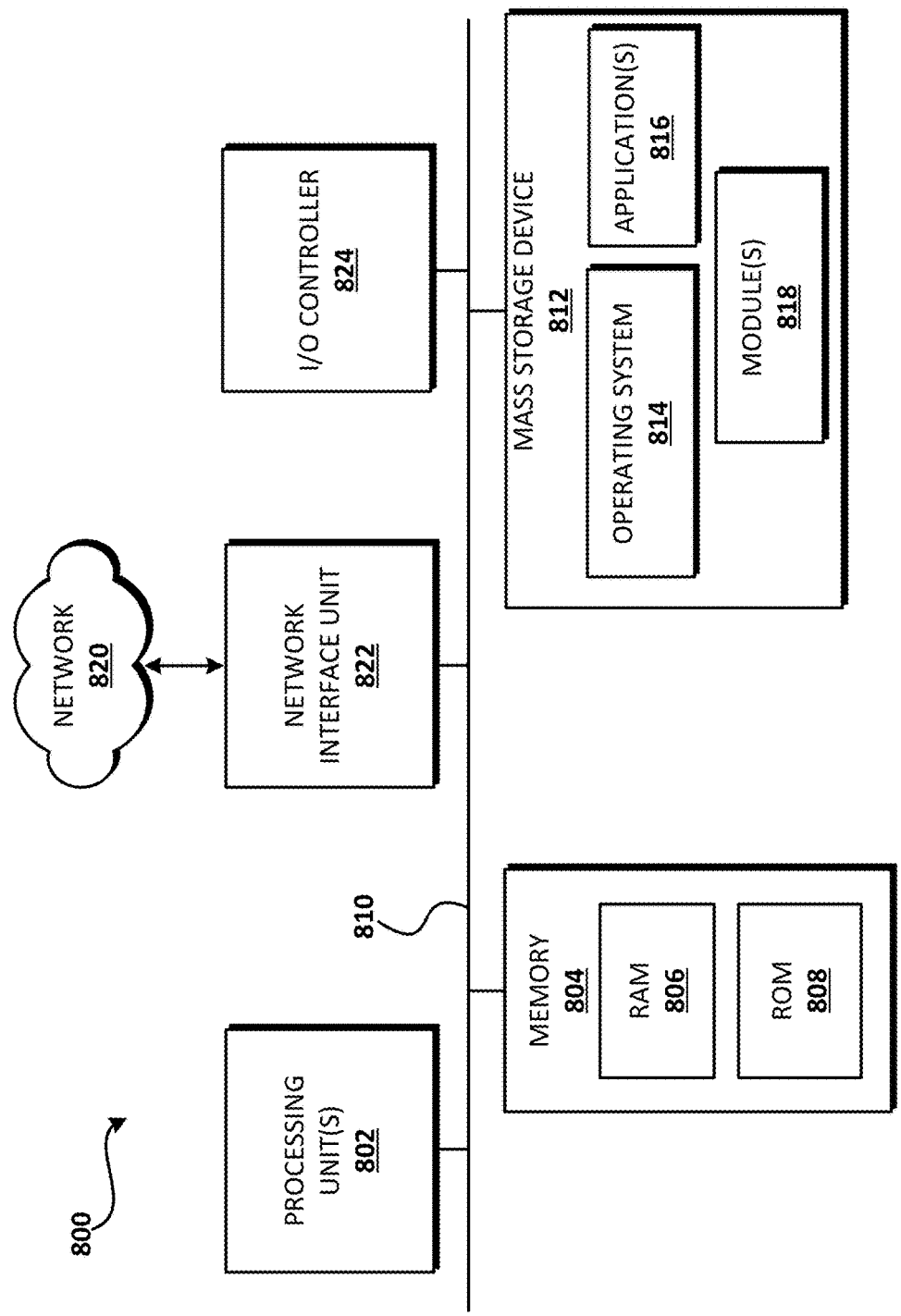
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a device, such as a computer or a server configured as part of the systems described herein, capable of executing computer instructions (e.g., a module or a program component described herein). The computer architecture 800 illustrated in FIG. 8 includes processing unit(s) 802, a system memory 804, including a random-access memory 806 ("RAM") and a read-only memory ("ROM") 808, and a system bus 810 that couples the memory 804 to the processing unit(s) 802.

Processing unit(s), such as processing unit(s) 802, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 800, such as during startup, is stored in the ROM 808. The computer architecture 800 further includes a mass storage device 812 for storing an operating system 814, application(s) 816, modules 818, and other data described herein.

The mass storage device 812 is connected to processing unit(s) 802 through a mass storage controller connected to the bus 810. The mass storage device 812 and its associated computer-readable media provide non-volatile storage for the computer architecture 800. Although the description of computer-readable media contained herein refers to a mass storage device, it should be appreciated by those skilled in the art that computer-readable media can be any available computer-readable storage media or communication media that can be accessed by the computer architecture 800.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 800 may operate in a networked environment using logical connections to remote computers through the network 820. The computer architecture 800 may connect to the network 820 through a network interface unit 822 connected to the bus 810. The computer architecture 800 also may include an input/output controller 824 for receiving and processing input from a number of other devices, including a keyboard, mouse, touch, or electronic stylus or pen. Similarly, the input/output controller 824 may provide output to a display screen, a printer, or other type of output device.

It should be appreciated that the software components described herein may, when loaded into the processing unit(s) 802 and executed, transform the processing unit(s) 802 and the overall computer architecture 800 from a general-purpose computing system into a special-purpose computing system customized to facilitate the functionality presented herein. The processing unit(s) 802 may be constructed from any number of transistors or other discrete circuit elements, which may individually or collectively assume any number of states. More specifically, the processing unit(s) 802 may operate as a finite-state machine, in response to executable instructions contained within the software modules disclosed herein. These computer-executable instructions may transform the processing unit(s) 802 by specifying how the processing unit(s) 802 transition between states, thereby transforming the transistors or other discrete hardware elements constituting the processing unit(s) 802.

Figure 9:
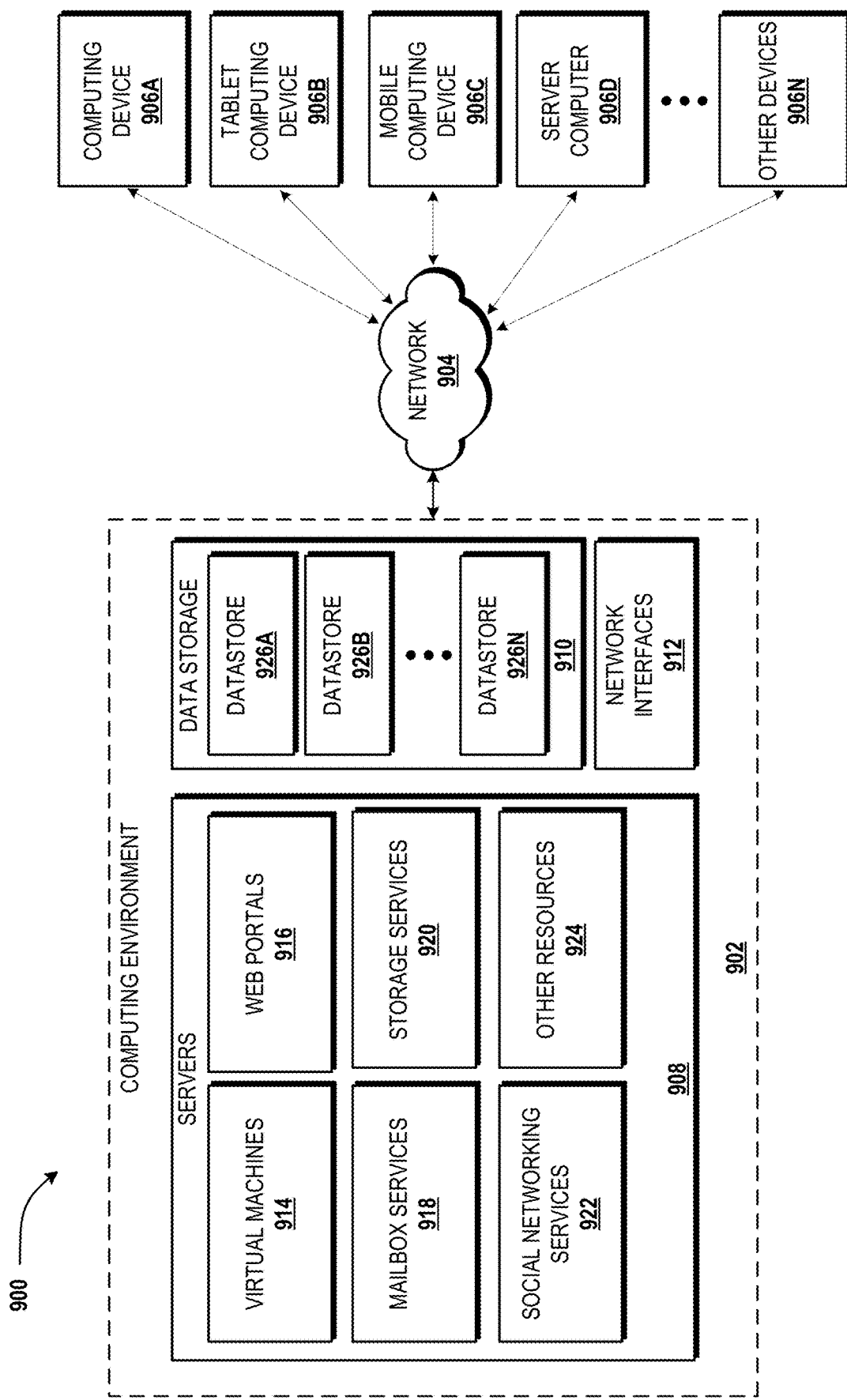
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein.

Accordingly, the distributed computing environment 900 can include a computing environment 902 operating on, in communication with, or as part of the network 904. The network 904 can include various access networks. One or more client devices 906A-906N (hereinafter referred to collectively and/or generically as "clients 906" and also referred to herein as computing devices 906) can communicate with the computing environment 902 via the network 904. In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902.

In various examples, the computing environment 902 includes servers 908, data storage 910, and one or more network interfaces 912. The servers 908 can host various services, virtual machines, portals, and/or other resources. In the illustrated configuration, the servers 908 host virtual machines 914, Web portals 916, mailbox services 918, storage services 920, and/or, social networking services 922. As shown in FIG. 9 the servers 908 also can host other services, applications, portals, and/or other resources ("other resources") 924.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more servers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the servers 908 and/or other data. That is, the datastores 926 also can host or store web page documents, word documents, presentation documents, data structures, algorithms for execution by a recommendation engine, and/or other data utilized by any application program. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects.

The present disclosure is supplemented by the following example clauses:

Example 1: A method comprising: providing a search query to a machine learning model; receiving a query embedding vector from the machine learning model that represents the search query in an embedding space; selecting an interaction embedding vector from a plurality of interaction embedding vectors based on a distance between the query embedding vector and the interaction embedding vector in the embedding space; retrieving a context of an application at a previous point in time based on the selected interaction embedding vector; and configuring the application based on the context.

Example 2: The method of Example 1, further comprising: monitoring the application for a change in content; in response to the change in content: providing a portion of a screenshot of the application to the machine learning model; receiving the interaction embedding vector from the machine learning model that represents the portion of the screenshot in an embedding space; and determining the context of the application when the screenshot was taken.

Example 3: The method of Example 1, wherein the context of the application comprises screen coordinates of the application, a file name of a document loaded by the application, a page of the document displayed by the application, a website address navigated to by the application, user credentials of the application, or login credentials of a website.

Example 4: The method of Example 2, further comprising: segmenting the screenshot into a plurality of portions based on content type; and selecting the portion of the screenshot from the plurality of portions.

Example 5: The method of Example 2, further comprising: storing the interaction embedding vector in a vector database, wherein the interaction embedding vector is selected from the plurality of interaction embedding vectors by searching the vector database for embedding vectors closest to or within a defined distance of the query embedding vector.

Example 6: The method of Example 1, wherein the interaction embedding vector comprises an index usable to retrieve the screenshot and the context of the application.

Example 7: The method of Example 6, further comprising: retrieving the screenshot and the context of the application using the interaction embedding vector; displaying the screenshot; and receiving a selection of the displayed screenshot, wherein the application is configured based on the context in response to receiving the selection of the screenshot.

Example 8: The method of Example 1, wherein configuring the application based on the context comprises opening a document that was open when the screenshot was taken, navigating to a website that was open when the screenshot was taken, or filling out a form with content taken from the form when the screenshot was taken.

Example 9: A system comprising: a processing unit; and a computer-readable storage medium having computer-executable instructions stored thereupon, which, when executed by the processing unit, cause the processing unit to: receive a current interaction of an individual application; provide the current interaction and a prompt to a machine learning model; receive a current interaction embedding vector from the machine learning model that represents the current interaction as it relates to the prompt in an embedding space; select an interaction embedding vector from a plurality of interaction embedding vectors based on a distance between the current interaction embedding vector and the interaction embedding vector in the embedding space, wherein the interaction embedding vector is associated with a previous state of an application; generate an action associated with the prompt based on the selected interaction embedding vector; and perform the action.

Example 10: The system of Example 9, wherein the computer-executable instructions further cause the processing unit to: display a selectable indication of the action, wherein the action is performed in response to receiving a selection of the selectable indication of the action.

Example 11: The system of Example 9, wherein the action displays content relevant to the current interaction, completes a partially-completed portion of content, opens a document, schedules a meeting, shares a document during a meeting, or attaches a document to an email.

Example 12: The system of Example 9, wherein the application comprises a videoconference application, wherein the interaction comprises a screenshot, wherein the individual application comprises an electronic message application, wherein the current interaction comprises a screenshot taken while drafting an electronic message, and wherein the action opens the document that was shared during the meeting based on content of the electronic message.

Example 13: The system of Example 9, wherein the interaction comprises a screenshot or an audio stream.

Example 15: The system of Example 9, wherein the prompt asks, given a set of documents, which documents a user might want to view.

Example 16: A computer-readable storage medium having encoded thereon computer-readable instructions that when executed by a processing unit causes a system to: provide a search query to a machine learning model; receive a query embedding vector from the machine learning model that represents the search query in an embedding space; select an interaction embedding vector from a plurality of interaction embedding vectors based on a distance between the query embedding vector and the interaction embedding vector in the embedding space; retrieve a context based on the selected interaction vector; and configure an application based on the context.

Example 17: The computer-readable storage medium of Example 16, wherein the search query references content included in the interaction of the application.

Example 18: The computer-readable storage medium of Example 16, wherein the context of the application describes attributes of the application that are not derived from content displayed by the application.

Example 19: The computer-readable storage medium of Example 16, wherein the plurality of interaction embedding vectors comprise a user history timeline, and wherein configuring the application based on the context returns the application to an earlier state.

Example 20: The computer-readable storage medium of Example 19, wherein the machine learning model generates the query embedding vector based on relationships identified between entries in the user history timeline.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   providing a search query to a machine learning model;
   receiving a query embedding vector from the machine learning model that represents the search query in an embedding space;
   selecting an interaction embedding vector from a plurality of interaction embedding vectors based on a distance between the query embedding vector and the interaction embedding vector in the embedding space, wherein the interaction embedding vector represents, in the embedding space, a user interaction with a computing device at a previous point in time;
   retrieving a context of an application at the previous point in time based on the selected interaction embedding vector; and
   configuring the application based on the context.

2. The method of claim 1, further comprising:
   monitoring the application for a pixel difference, a change in saliency, or a change of semantic embeddings of the content;
   providing a portion of a screenshot of the application to the machine learning model;
   receiving the interaction embedding vector from the machine learning model that represents the portion of the screenshot in an embedding space; and
   determining the context of the application when the screenshot was taken.

3. The method of claim 2, further comprising:
   segmenting the screenshot into a plurality of portions based on content type; and
   selecting the portion of the screenshot from the plurality of portions.

4. The method of claim 2, further comprising:
   storing the interaction embedding vector in a vector database, wherein the interaction embedding vector is selected from the plurality of interaction embedding vectors by searching the vector database for embedding vectors closest to or within a defined distance of the query embedding vector.

5. The method of claim 1, wherein the context of the application comprises screen coordinates of the application, a file name of a document loaded by the application, a page of the document displayed by the application, a website address navigated to by the application, user credentials of the application, or login credentials of a website.

6. The method of claim 1, wherein the interaction embedding vector comprises an index usable to retrieve the screenshot and the context of the application.

7. The method of claim 6, further comprising:
   retrieving the screenshot and the context of the application using the interaction embedding vector;
   displaying the screenshot; and
   receiving a selection of the displayed screenshot, wherein the application is configured based on the context in response to receiving the selection of the screenshot.

8. The method of claim 1, wherein configuring the application based on the context comprises opening a document that was open when the screenshot was taken, navigating to a website that was open when the screenshot was taken, or filling out a form with content taken from the form when the screenshot was taken.

9. A computer-readable storage medium having encoded thereon computer-readable instructions that when executed by a processing unit causes a system to:
provide a search query to a machine learning model;
receive a query embedding vector from the machine learning model that represents the search query in an embedding space;
select an interaction embedding vector from a plurality of interaction embedding vectors based on a distance between the query embedding vector and the interaction embedding vector in the embedding space, wherein the interaction embedding vector represents, in the embedding space, a user interaction with a computing device at a previous point in time;
retrieve a context based on the selected interaction vector; and
configure an application based on the context.

10. The computer-readable storage medium of claim 9, wherein the search query references content included in the interaction of the application.

11. The computer-readable storage medium of claim 9, wherein the context of the application describes attributes of the application that are not derived from content displayed by the application.

12. The computer-readable storage medium of claim 9, wherein the plurality of interaction embedding vectors comprise a user history timeline, and wherein configuring the application based on the context returns the application to an earlier state.

13. The computer-readable storage medium of claim 12, wherein the machine learning model generates the query embedding vector based on relationships identified between entries in the user history timeline.

* * * * *